US00RE35993E

United States Patent [19]

Gierveld

[11] E Patent Number: Re. 35,993

[45] Reissued Date of Patent: Dec. 15, 1998

[54] FRAME FOR A SKATE, METHOD FOR THE MANUFACTURE THEREOF, SKATING SHOE AND SKATE

[75] Inventor: Johan Gierveld, Wierden, Netherlands

[73] Assignee: Gierveld Beheer B.V., Wierden, Netherlands

[21] Appl. No.: 588,783

[22] Filed: Jan. 19, 1996

Related U.S. Patent Documents

Reissue of:

[64] Patent No.: 5,046,746
Issued: Sep. 10, 1991
Appl. No.: 315,839
Filed: Feb. 27, 1989

U.S. Applications:

[63] Continuation of Ser. No. 13,681, Feb. 2, 1993, abandoned.

[51] Int. Cl.[6] ..... A63C 17/02

[52] U.S. Cl. ..... 280/11.22; 280/11.27

[58] Field of Search ..... 29/402.19; 280/11.19, 280/11.22, 11.27, 11.28, 881, 11.12, 11.13, 7.13, 7.14, 87.042

[56] References Cited

U.S. PATENT DOCUMENTS

| | | | |
|---|---|---|---|
| 2,412,290 | 12/1946 | Rieske | 280/11.22 |
| 2,533,277 | 12/1950 | Miller | 280/11.27 |
| 2,552,630 | 5/1951 | Hutchinson | 228/56 |
| 3,927,449 | 12/1975 | Gibble et al. | 29/148.4 |
| 4,028,795 | 6/1977 | Takahashi et al. | 29/403 |
| 4,043,023 | 8/1977 | Lombard | 29/527.6 |
| 4,351,936 | 9/1982 | Sandino | 280/7.13 |
| 4,657,265 | 4/1987 | Ruth | 280/7.13 |
| 4,699,390 | 10/1987 | Cote | 280/121 |
| 4,716,270 | 12/1987 | Gnanamuthu et al. | 219/121 |

FOREIGN PATENT DOCUMENTS

| | | | |
|---|---|---|---|
| 0295081 | 12/1988 | European Pat. Off. | 280/11.22 |
| A-24 46 210 | 4/1973 | Germany . | |
| A-77 01728 | 8/1977 | Netherlands . | |
| A-80 04178 | 3/1982 | Netherlands . | |
| A-87 00023 | 4/1988 | Netherlands . | |
| A-87 01888 | 3/1989 | Netherlands . | |

OTHER PUBLICATIONS

Robert A. Wilson, "Plastics Reference: Primer", Automotive Industries, Sep., 1978, pp. 31–37, 43, 45, 47, 49, 51 and 53.

*Primary Examiner*—Richard M. Camby
*Attorney, Agent, or Firm*—Webb Ziesenheim Bruening Logsdon Orkin & Hanson, P.C.

[57] ABSTRACT

A support assembly for attachment to a skating shoe includes a frame having two fastening brackets with openings through which connection members extending away from the sole plate of the skating shoe can extend and either a skate blade or at least three freely rotatable wheels attached to the frame. When the support assembly includes at least three wheels, they are attached to the frame such that each group of at least two wheels has an underlying tangent which extends outside each remaining wheel.

16 Claims, 10 Drawing Sheets

13
34
31
33
35
27
32
29
32
27
13
30
15
36
35
33
31

FRAME FOR A SKATE, METHOD FOR THE MANUFACTURE THEREOF, SKATING SHOE AND SKATE

Matter enclosed in heavy brackets [ ] appears in the original patent but forms no part of this reissue specification; matter printed in italics indicates the additions made by reissue.

*This is a Continuation of application Ser. No. 08/013, 681, filed Feb. 2, 1993, now abandoned, which in turn is a Reissue application of U.S. application Ser. No. 07/315,839, filed Feb. 27, 1989, U.S. Pat. No. 5,046,746, issued Sep. 10, 1991.*

BACKGROUND OF THE INVENTION

Field of the Invention

The invention relates to a frame for a skate intended for coupling to a skating shoe provided with a sole plate, which frame carries at least three freely rotatable wheels lying in one principal plane or a skate blade.

Such a frame is known. With the known frame for an in-line roller skate the three or more freely rotatable wheels are placed such that they are all in contact with the ground simultaneously. It is known from the sport of ice skating that the skate blade of a skate, or at any rate a better quality skate, is ground such that the sliding surface is not straight but displays a curvature whereby the median point of the curvature lies in the vertical plane above the skate, for example at a distance of 15 to 20 meters. Hereby achieved is that during skating only a part of the sliding surface is on the ice. The contact pressure is hence greater than if the total length of the gliding surface were to be in contact with the ice, with the result that more effortless skating can take place, while moreover cornering is simpler due to the smaller contact length. In addition to this, a practised skater is capable as required of bringing a front, middle or rear part of the gliding surface into contact with the ice as a result of which he can utilise his strength to the maximum while maintaining his stability under even the most extreme circumstances.

The insight underlying the invention is that for the achieving of high speeds and the best possible cornering, the above outlined principles from the ice skating sport could be applied to the sport of roller skating.

SUMMARY OF THE INVENTION

In this respect the invention provides a frame for a roller skate as described above of which each connected group of at least two wheels has a tangent which extends outside each remaining wheel. In the case of three wheels for example, only two wheels touch the ground simultaneously using such a construction. This could be regarded as a discrete approach to the curvature of an ice skate gliding surface. For adaptation to individual requirements that variant can serve in which the position of at least one wheel is adjustable.

In particular, the height and longitudinal position of at least the front wheel can be adjustable.

In respect of the greatest possible stability, that embodiment has been found preferable in which the rear wheel has a greater diameter than the other wheels.

In view of the fairly great variation in the individual position of the feet of users, a variation can advantageously display the special feature that the frame is adjustable in sideways direction relative to the sole plate.

A preferred embodiment displays the feature that the frame has two coupling parts located at a lengthwise interval from one another for coupling the frame to a skating shoe having coupling members arranged at corresponding places on or in the sole plate thereof.

Each coupling part preferably displays a hole for passage of a coupling bolt or coupling threaded end. In this case a particular embodiment can display the special feature for sideways adjustment that at least one hole is a slotted hole extending in transverse direction. An embodiment may also possess the feature that at least one hole is a slotted hole extending in transverse direction for adaptation to the distance between the coupling members of a skating shoe. An adaptation can be hereby achieved for skating shoes of diverse sizes.

A frame can be provided with at least one slotted hole serving for position adjustment, the edge zone of which is provided with ribs extending at least more or less transversely of the longitudinal direction of the slotted hole and having a fixed pitch distance for co-action with a positioning ring with complementary ribs, through which slotted hole and which ring a shaft screw, bolt, threaded end or other elongate member can extend. Reliable attachment in a required position can be achieved hereby, both with regard to the adjustment between the frame and a skating shoe as well as the position of the wheel shafts relative to the frame.

The invention extends further to a skating shoe with a sole plate wherein or whereon two coupling members are arranged. Such a skating shoe is per se known.

The object of the invention is now to improve the simplicity and reliability of the skating shoe of the known type and proposes to this end a skating shoe of the type described of which each coupling member is embodied as a threaded end part extending outward from the bottom plate.

A very simple embodiment is that according to which the threaded end part forms part of a screw bolt, the head of which grips onto the inner surface of the sole plate, which bolt is attached to the sole plate by means of a nut gripping onto the outer surface of the sole plate.

That variant is preferably applied in which the upper surface of the head of the bolt lies in the upper surface of the sole plate. Thus ensured is a completely smooth inside surface of the skating shoe, which is essential for the comfort of the user.

An embodiment which can be cheaply and easily mass produced is that in which the sole plate consists of reinforced thermoplastic material.

The invention also extends to a skate. A skate according to the invention is characterized by:

a shoe with a sole plate, wherein or whereon two coupling members are arranged and a frame coupled therewith by means of screw connections, as described in this specification.

In a preferred embodiment of this roller skate according to the invention each coupling part displays a slotted hole extending in longitudinal direction for passage of a coupling bolt or threaded end. This preferred embodiment further displays the feature that a nut co-acting with the threaded end part grips onto the edge of the lengthwise extending slotted hole via a supporting ring and an adjusting ring having a diameter corresponding to the breadth of the slotted hole, through which an eccentrically placed hole for passage of the threaded end part extends such that by turning of that adjusting ring the transverse position of that hole and thereby the position of the frame relative to the sole plate of the skating shoe is adjustable and can be fixed by tightening the nut. It will be apparent that the supporting ring and the adjusting ring can if required be a single unit.

A frame for a skate can be manufactured from one monolithic block by the selective removal of material portions until the required shape remains. Such a working method is time-consuming and expensive. According to another method use is made of an injection moulding technique. Such a technique does not always give the required very high accuracy in dimensioning, while finishing is often necessary.

The invention provides a very simple, cheap and reliable method which guarantees accuracy of dimensions using very simple means. This method for the production of a frame for an ice skate or roller skate comprises the steps:

(1) the provision of an extrusion device with an injection nozzle of which the shape of the passage opening corresponds with either the front or rear view of a frame for manufacture, (2) the manufacture using the extrusion device of a profiled bar from optionally reinforced plastic or a metal such as aluminium, (3) the division where required of the bar into parts of suitable length; and (4) the selective removal of portions of the material of that bar by, for example, drilling, milling and/or grinding in order to obtain a frame of the required shape and dimensions.

In a particular embodiment this method displays the characteristic that the passage opening of the injection nozzle has a form such that the extruded bar displays at least one zone with longitudinally extending ribs with a fixed pitch distance. These ribs can serve together with a slotted hole for co-action with a positioning ring having complementary ribs, through which slotted hole and which ring a shaft, screw, bolt, threaded end or other elongate member can extend for adjustment of the position of relevant parts relative to the frame.

BRIEF DESCRIPTION OF THE DRAWINGS

The invention will now be elucidated with reference to the drawing. In the drawings.

DETAILED DESCRIPTION OF THE PREFERRED EMBODIMENTS

Figure 1:
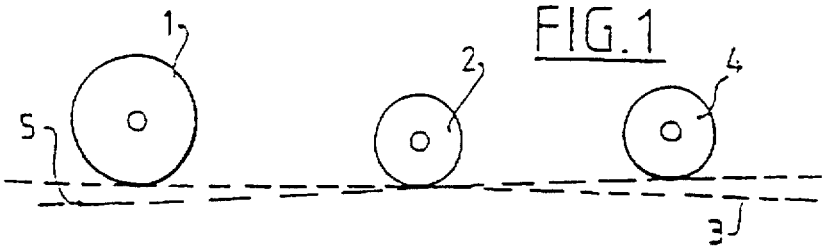
FIGS. 1, 2 and 3 show by way of example three configurations of wheels in accordance with the invention.
Figure 2:
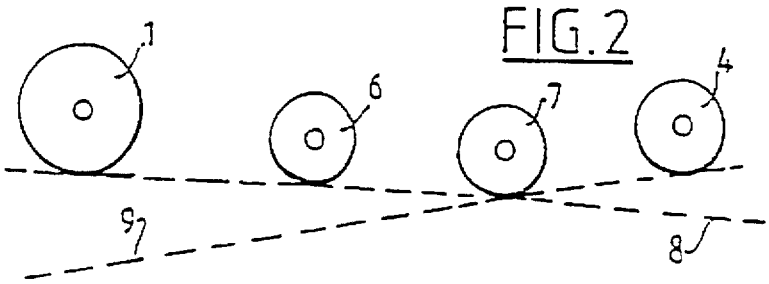
Figure 3:
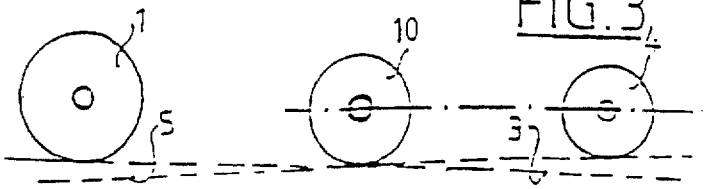

FIGS. 1, 2 and 3 show by way of example three schematically indicated configurations of wheels which form part of a frame (not drawn) for a roller skate. According to the invention each connected group of at least two wheels has a tangent extending outside each remaining wheel. Wheels I and 2 according to FIG. 1 have a tangent 3 extending outside wheel 4. Wheels 2 and 4 have a tangent 5 extending outside wheel 1. It will be apparent that what is achieved with this configuration is that either wheels 1 and 2 or wheels 2 and 4 touch the ground simultaneously. This therefore implies that wheels 1 and 4 can never touch the ground simultaneously.

FIG. 2 shows a configuration whereby two wheels 6, 7 are situated between wheels 1 and 4. Wheels 1, 6 and 7 have a common tangent 8 extending outside wheel 4. Wheels 7 and 4 have a common tangent 9 extending outside wheels 1 and 6. In this way is achieved that either the group of wheels 1, 6 and 7 or the group of wheels 7, 4 touch the ground simultaneously.

FIG. 3 shows a configuration corresponding in principle with the configuration in FIG. 1, with the understanding that situated between wheels 1 and 4 is a wheel 10 with a greater diameter than wheel 4. This configuration as in FIG. 3 that is outlined as an example serves to indicate that the position, the diameter or a combination of both can be chosen in order to obtain the location of the tangents.

Figure 4:
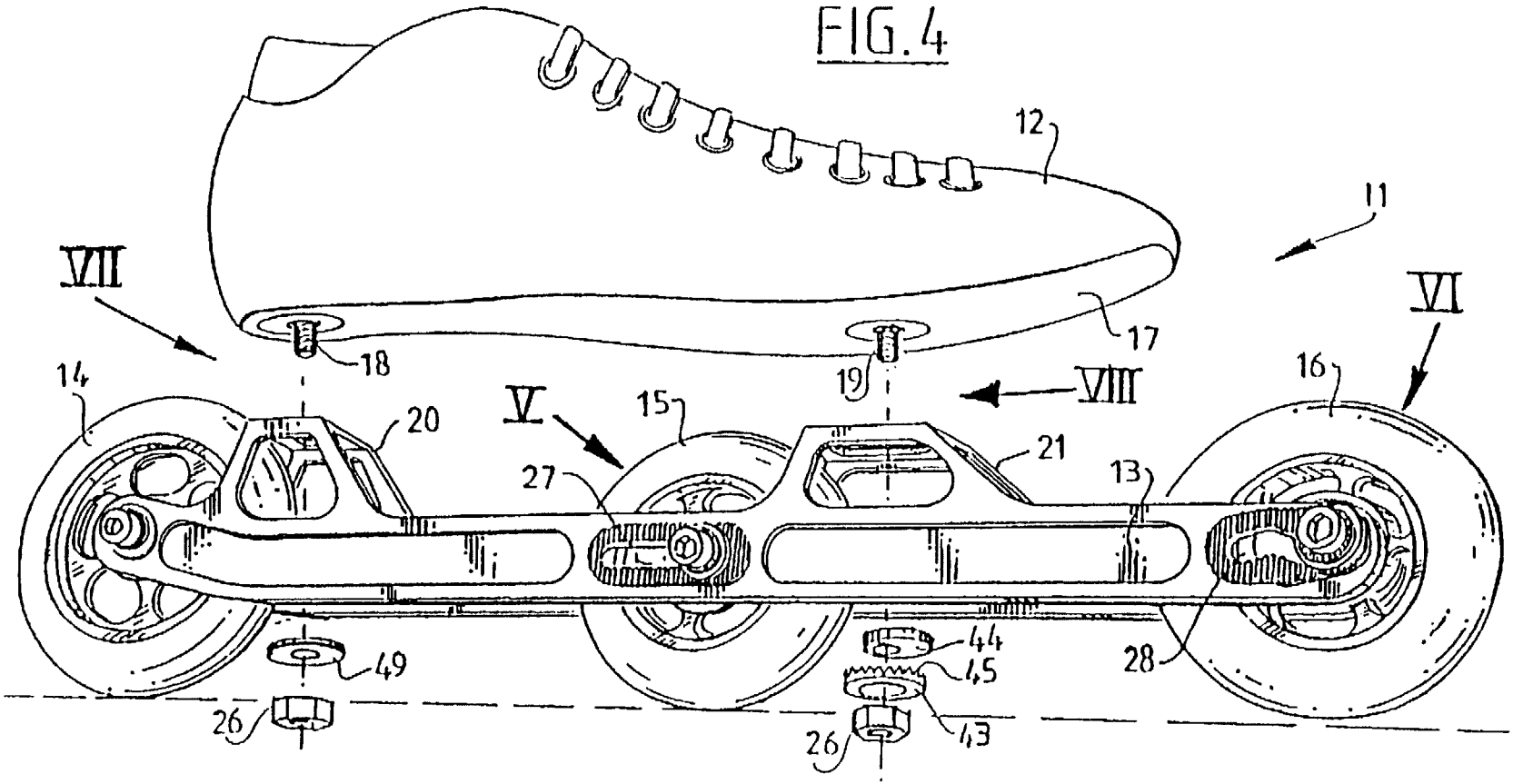
FIG. 4 is a roller skate according to the invention, whereby the constituent parts are depicted at some mutual distance for the sake of clarity.

FIG. 4 shows a roller skate 11 with a shoe 12 and a frame 13 which carries wheels 14, 15 and 16.

The shoe 12 is provided with a sole plate 17 carrying two threaded end parts (connection members) 18, 19. More detailed reference will be made to this hereafter on the basis of FIG. 8. These threaded end parts 18, 19 can co-act with fastening brackets 20, 21 on the upper side of the frame 13.

The rear wheel 14 has a greater diameter than the wheels 15, 16. This greater diameter of the rear wheel 14 ensures improved stability of the skater. From FIG. 4 it will be apparent that with respect to the greater diameter of the wheel 14 the frame is given a slightly upward folded form on the relevant rear side. Hereby achieved is that the rotating shafts of the wheels 14, 15, 16 all grip approximately in the middle of the frame. The manner in which this is realized will be discussed in more detail with reference to FIGS. 5 and. 6.

Figure 7:
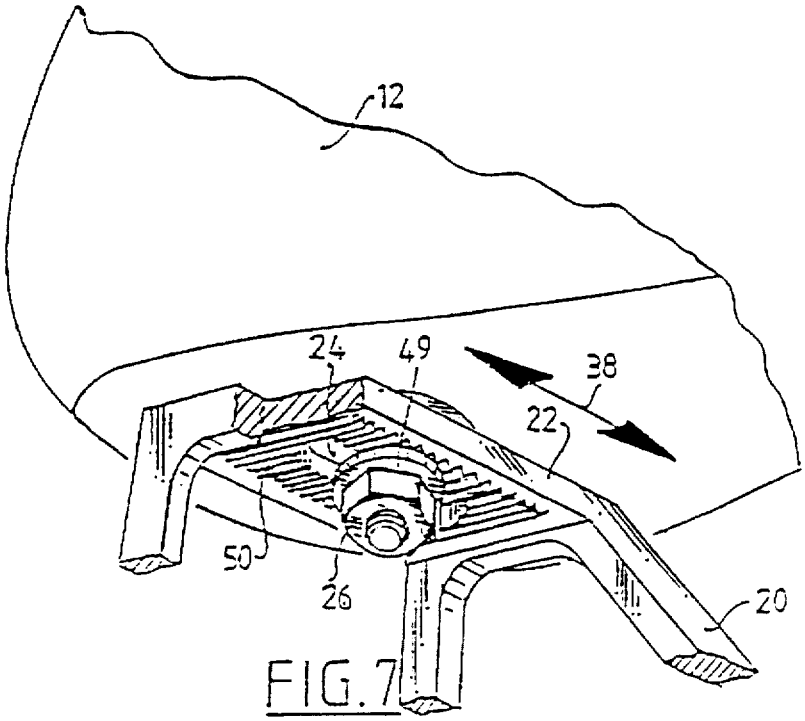
FIG. 7 is a perspective view of the detail VII of FIG. 4.
Figure 8:
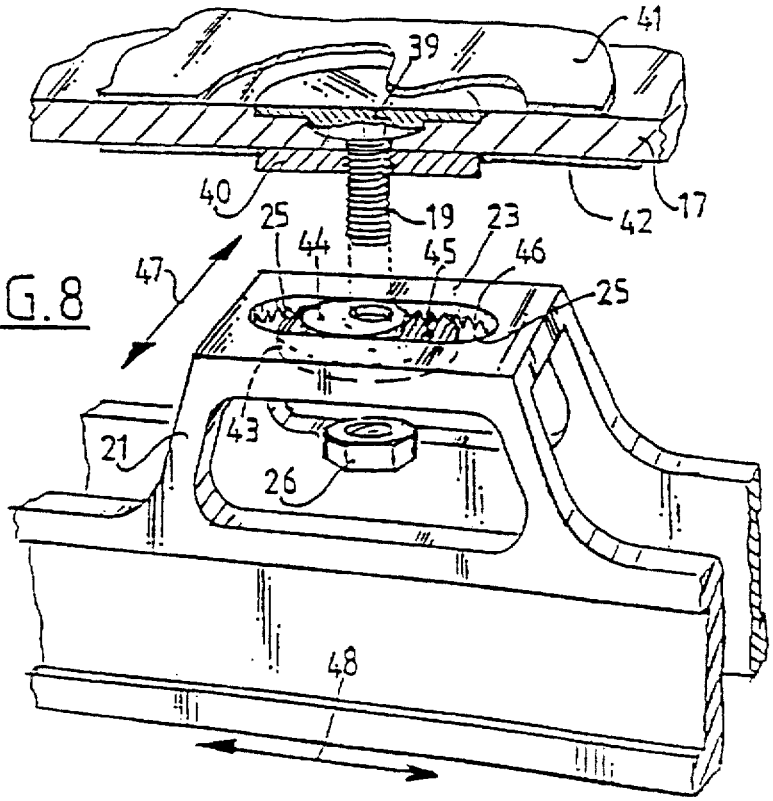
FIG. 8 shows partly a cross section and partly a perspective view of the detail VIII from FIG. 4.

As FIGS. 7 and 8 respectively show in more detail, the fastening brackets 20, 21 display respective flat top parts, 22, 23 wherein a transverse slotted hole 24 and a longitudinal slotted hole 25 are respectively arranged. These holes serve for the passage of the respective threaded end parts 18 and 19. The threaded end parts 18, 19 can be coupled with the parts 22, 23 using nuts 26.

The shaft of the wheel 15 is coupled by means of a screwed connection to the frame 13 by means of slotted holes 27. The slotted holes 27 make it possible to adjust the longitudinal position of the wheel 15.

The wheel 16 is connected to the frame 13 by means of slotted holes 28 extending substantially in lengthwise direction while displaying a slight Z shape.

Figure 5:
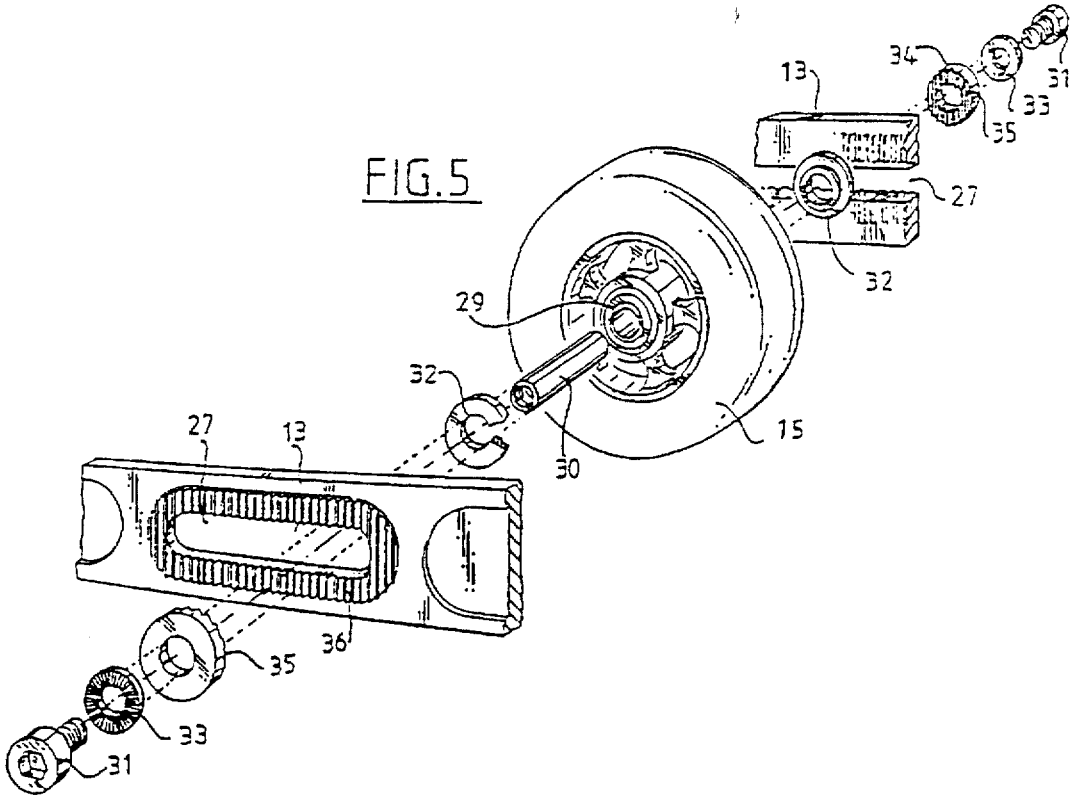
FIG. 5 is an exploded view of the detail V according to FIG. 4.

In FIG. 5 the various constituent parts are shown at some mutual distance for the clarification of their relative positioning.

The wheel 15 is carried by means of ball bearings 29 by a bearing bush 30. This bearing bush 30 is provided with an internal screw thread at its outer ends for co-action with the locking screws 31. Clamping rings 32 are situated on either side of the ball bearings 29.

The head or each of the locking screws 31 grips via spring washers 33 onto a positioning ring 34 provided on the side facing the frame 13 with a rib pattern 35. The peripheral zone of the slotted hole 27 of frame 13 is provided with a complementary pattern of ribs 36. After placing of the locking screws 31 a positive positioning can already be achieved, even without the screws 31 being forcibly tightened, as would be the case with a normal clamp connection of two more or less smooth surfaces to one another.

Figure 6:
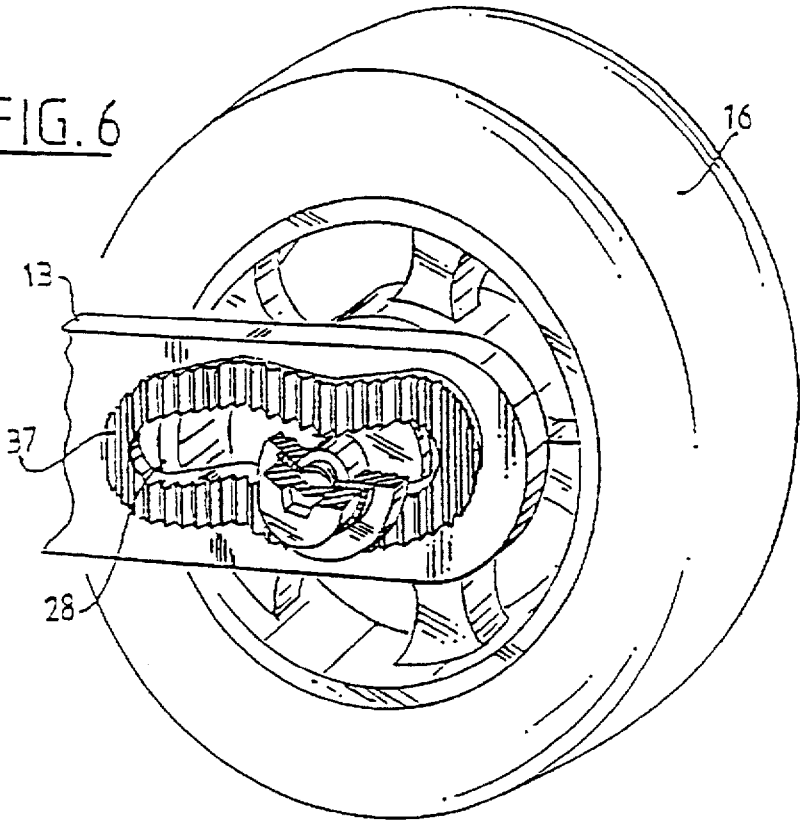
FIG. 6 shows the detail VI from FIG. 4, in a partly broken away perspective view.

FIG. 6 shows in a partly broken away perspective view that the manner of attaching the wheel 16 is the same as that of the wheel 15 as in FIG. 5. This attachment will not therefore be further discussed.

The slight Z-shape of the slotted hole 28 enables on the one hand a good adaptation to different shoe sizes whilst at the same time height adjustment of the wheel 16 is assured over a sufficiently wide range. Such an adjustment is of great importance as the angle between the tangents 3 and 5 as shown in FIG. 1 can vary greatly for each individual for an optimum performance.

It can be seen in FIG. 6 that the slotted hole 28 also has a rib pattern 37. The ribs 36 and 37 extend more or less in lengthwise direction of the slotted hole 28. It will be apparent that this longitudinal direction does not have to be strictly adhered to but that certain deviations can be tolerated.

FIG. 7 shows the manner in which the shoe 12 with its heel part is attached to the rear bracket 20 of the frame 13. The threaded end part 18 co-acts with the nut 26, which grips via ring 49 onto the edge zone of the slotted hole 24 provided with ribs 50. As has already been discussed above with reference to FIGS. 5 and 6, a reliable positioning is herewith achieved which is practically independent of the force with which the nut 26 is tightened. The sideways adjustment possibility is symbolically indicated with an arrow 38.

FIG. 8 shows the manner in which the threaded end part 19 is connected to the sole plate 17 and the manner in which a longitudinal and transverse adjustment possibility is realized.

The threaded end part 19 is provided with a flange plate 39, together with which it forms a screw bolt. The threaded end part 19 extends through the sole plate 17 via a hole arranged therein. For fastening of the screw bolt 19, 39 a nut 40 is screwed onto the threaded end part 19. The flange plate 39 and the nut 40 have a large gripping surface area whereby a good distribution of force over a large surface area of the sole plate 17 is achieved. The sole plate 17 is formed for great mechanical strength as a polyester plate reinforced with reinforcing fibres and optionally laminated. The sole plate 17 is provided on both the inside and outside with a coating layer 41, 42 respectively. To obtain a smooth inner surface the upper surface of the sole plate 17 and the upper surface of the flange plate 39 are flush with one another.

The longitudinal slotted hole 25 has a greater breadth than is necessary just for the passage of the threaded end part 19. After being tightened onto the threaded end part 19, the nut 26 grips onto the lower surface of the flat upper part 23 via a positioning ring 43. The breadth of the slotted hole 25 is filled by an eccentric ring 44 which makes a transverse adjustment possible. The ring 43 is provided with positioning ribs 45 in the manner already discussed above in accordance with FIG. 5, which co-act with complementary ribs 46 in the peripheral zone of the slotted hole 25. It will be apparent that when use is made of these positioning ribs, the positioning ring 43 and the eccentric ring 44 cannot be embodied as a single entity. This is only possible in the absence of these ribs.

An arrow 47 indicates the transverse adjustability while an arrow 48 symbolises the longitudinal adjustability.

If required, nuts, screw heads and such components can also be covered by a protective cover to prevent the entry of sand or dirt.

Figure 9:
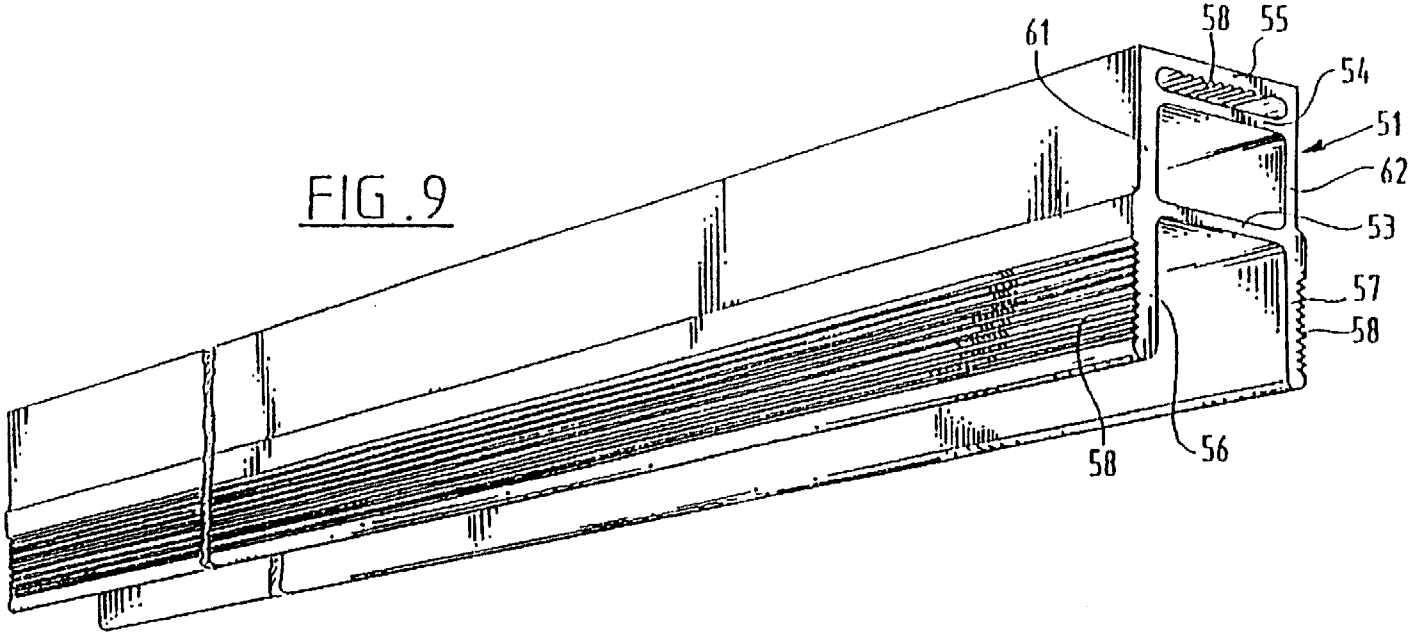
FIG. 9 shows an extruded aluminium profile.

FIG. 9 shows an aluminium profile 51 manufactured by means of an extrusion device (not drawn). This aluminium profile is cut from a longer profile bar.

Figure 10:
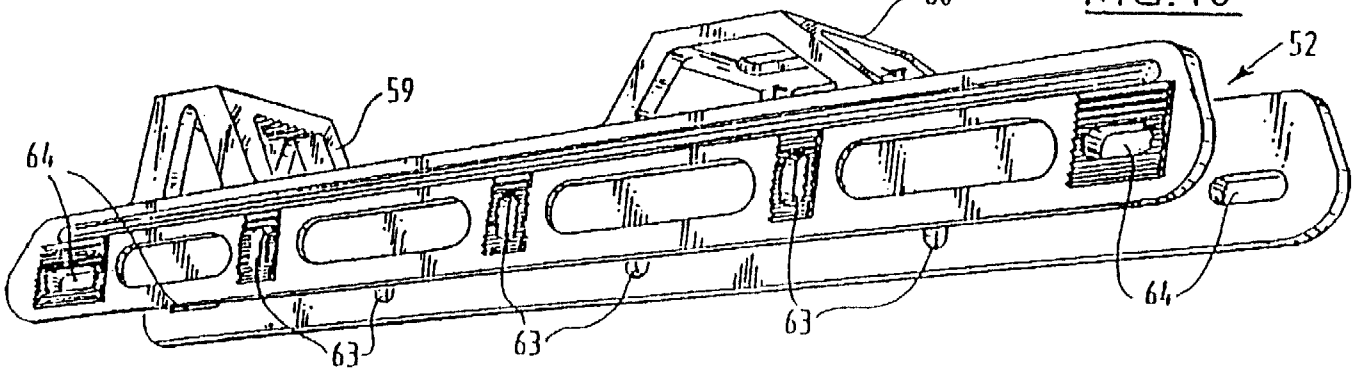
FIG. 10 shows a frame for an in-line roller skate obtained by the selective removal of parts of the profile according to FIG. 9.

FIG. 10 shows a frame 52 for an in-line roller skate, which frame 52 is manufactured by the selective removal of portions of the material of the profile 51.

The profile 51 has a cross sectional form corresponding with the front and rear view of the frame 52. The frame is roughly U-shaped and has three transverse walls 53, 54, 55 as well as two legs 56 and 57. The inner surface of the transverse wall 55 displays ribs 58 with a fixed pitch distance. The outer surfaces of the legs 56 and 57 also display these ribs 58.

The frame 52 comprises two fastening brackets 59, 60, the side legs of which correspond with the side walls 61, 62 of the profile 51 and the upper walls of which correspond with the respective transverse walls 55 and 54. The legs of the transverse walls 56, 57 are locally perforated and provided with three transverse slotted holes 63 and two longitudinal slotted holes 64. At these locations the ribs are maintained. They are further completely removed. With reference to FIG. 5 for example, it will be apparent how the ribs 58 next to the slotted holes 63 can serve for the vertical positioning of wheels.

Figure 11:
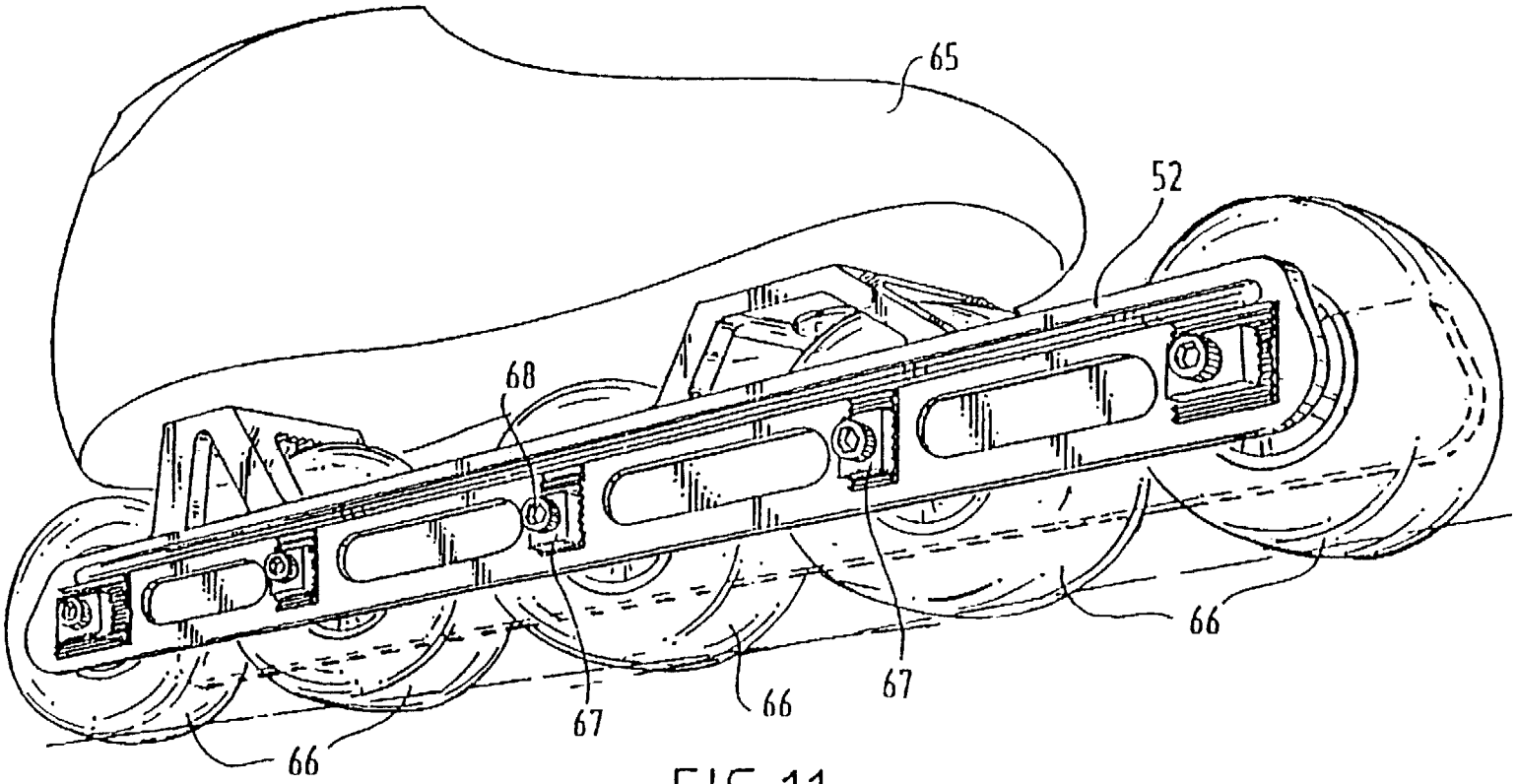
FIG. 11 shows a roller skate with a frame as in FIG. 10.

FIG. 11 shows a skating shoe 65 to which the frame 52 is attached. This frame 52 carries five wheels 66 in this assembled form, this by means of ribbed positioning plates 67 and screw members 68.

Figure 12:
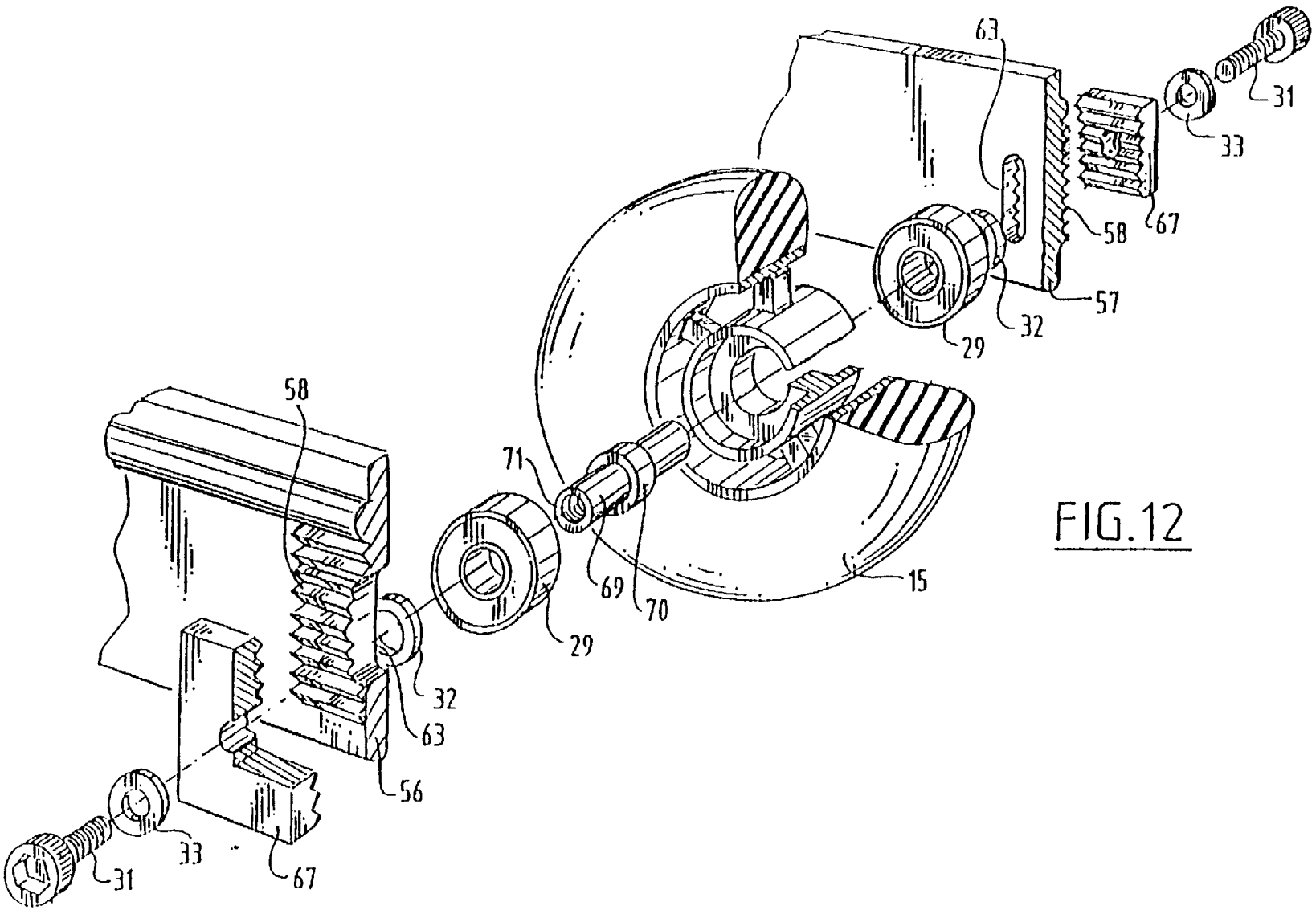
FIG. 12 is an exploded view from which can be seen in what manner the wheels of the roller skate according to FIG. 11 are mounted on the frame.

FIG. 12 shows a view of a detail of FIG. 11 corresponding with FIG. 5. Members corresponding with previously shown and described members will not be discussed again. They are designated here with the same reference numerals as above.

Figure 13:
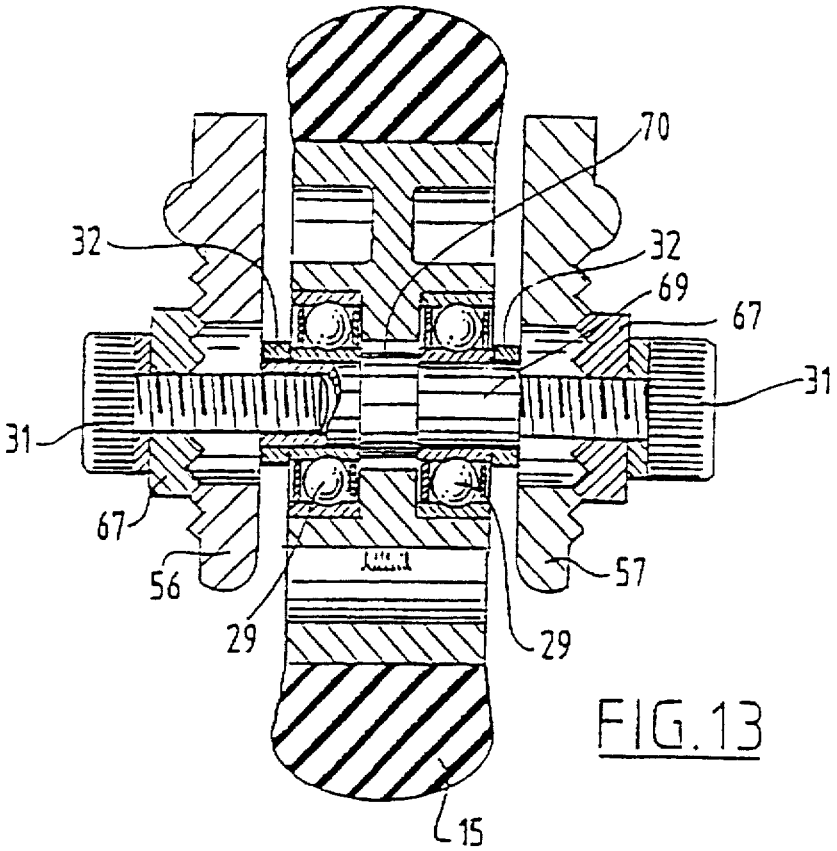
FIG. 13 is a cross section through the mounted wheel according to FIG. 12.

The wheel 15 is carried via the two ball bearings 29 (see also FIG. 13) by a shaft 69 having a thickened central portion 70, which serves for the axial positioning of the ball bearings 29. The clamping rings 32 co-act with the stationary part of the ball bearings 29 for axial positioning relative to the side walls 56 and 57.

The locking screws 31 co-act via the positioning plates 67 with threaded holes 71 in the shaft 69.

Figure 14:
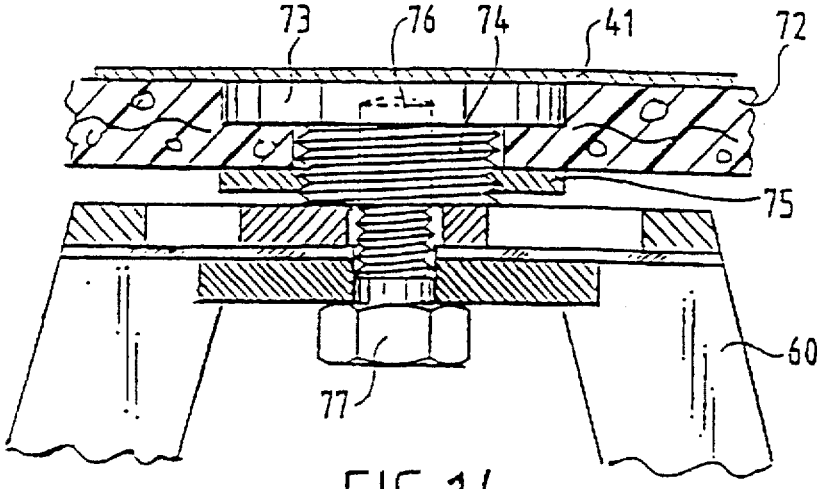
FIG. 14 is a view illustrating the way in which the frame as in FIG. 11 is attached to the skating shoe.

FIG. 14 shows a sole plate 72 of fibre reinforced plastic. A flange plate 73 is embedded therein such that its upper surface falls together with the upper surface of the sole plate 72. The flange plate 73 carries a threaded body 74 which is held fixedly on the sole plate 72 using a nut 75. The threaded body 74 is provided with a threaded hole 76 for co-action with a fastening bolt 77 for fixing the bracket 60 of the frame 52 to the sole plate 72.

Figure 15:
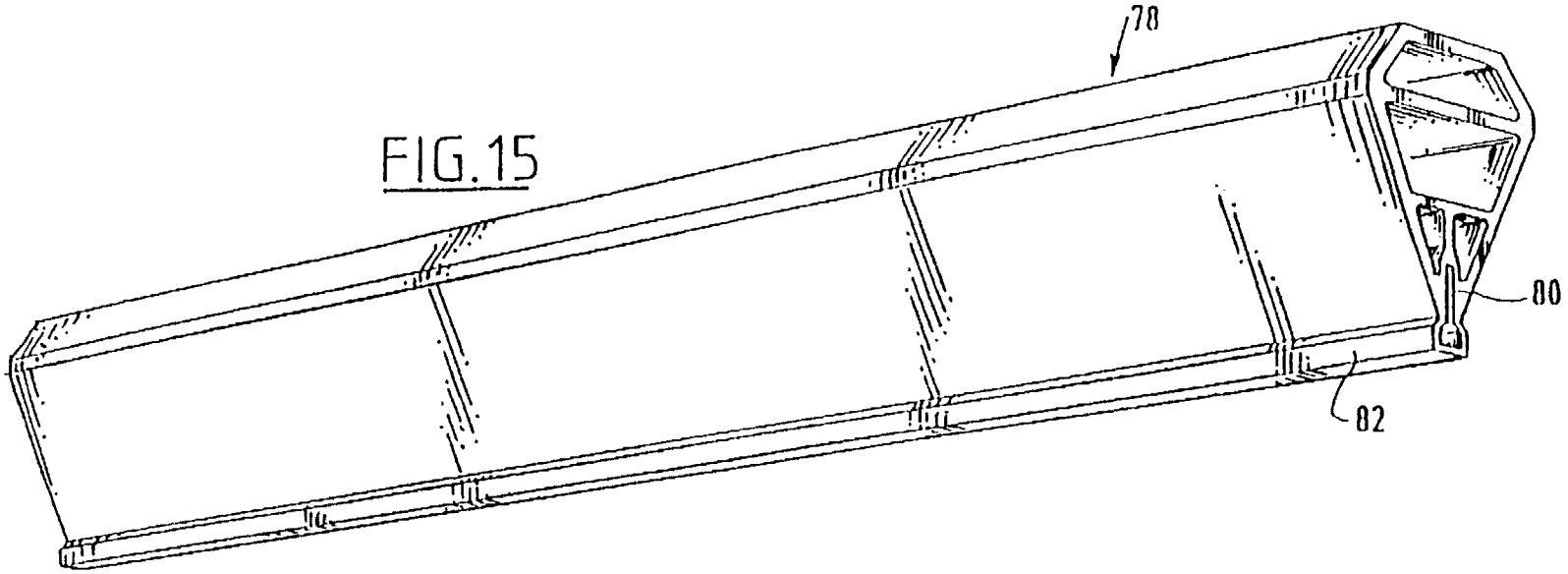
FIG. 15 shows an extruded aluminium profile for the manufacture of a frame for an ice skate.

FIG. 15 shows a profile 78 of extruded aluminium.

Figure 16:
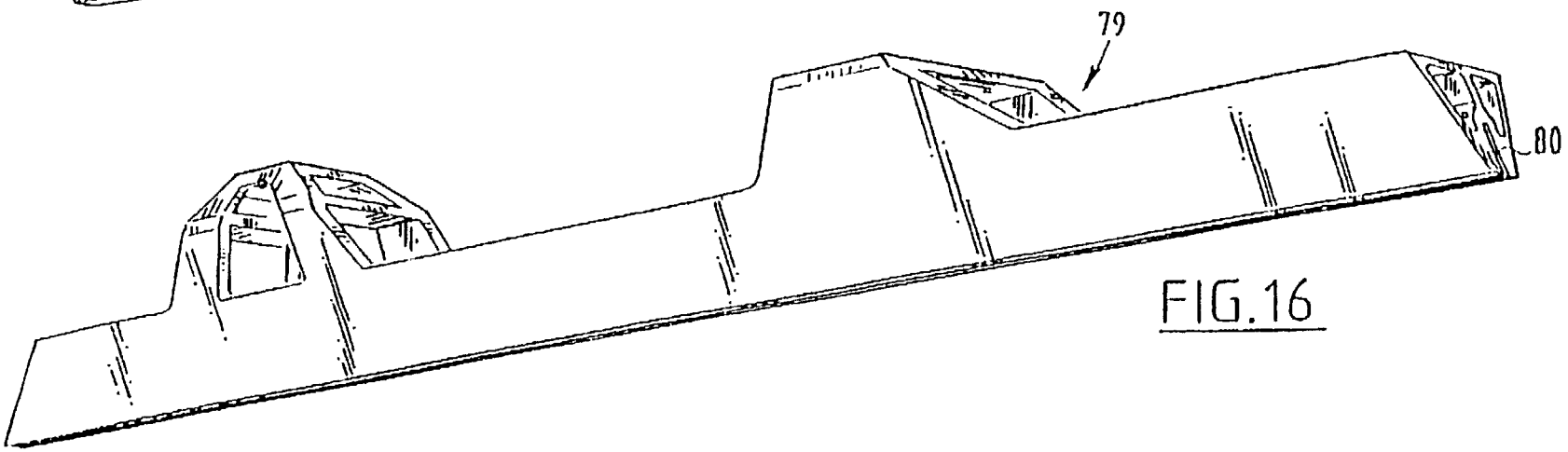
FIG. 16 shows a frame manufactured by the selective removal of portions of the profile according to FIG. 15.

FIG. 16 shows a frame 79 for an ice skate manufactured from the profile 78 by selective removal of portions of the material of the profile 78. This requires no further elucidation after the discussion of FIGS. 9 and 10. It is noted that the profile 78 displays a material bridge 82 at the location of a longitudinal slot 80 for receiving a skate blade 81 (see FIG. 17). This is removed in the manufacture of the frame 79 but serves during extrusion to control the precise design of the material bounding a longitudinal slot 80.

Figure 17:
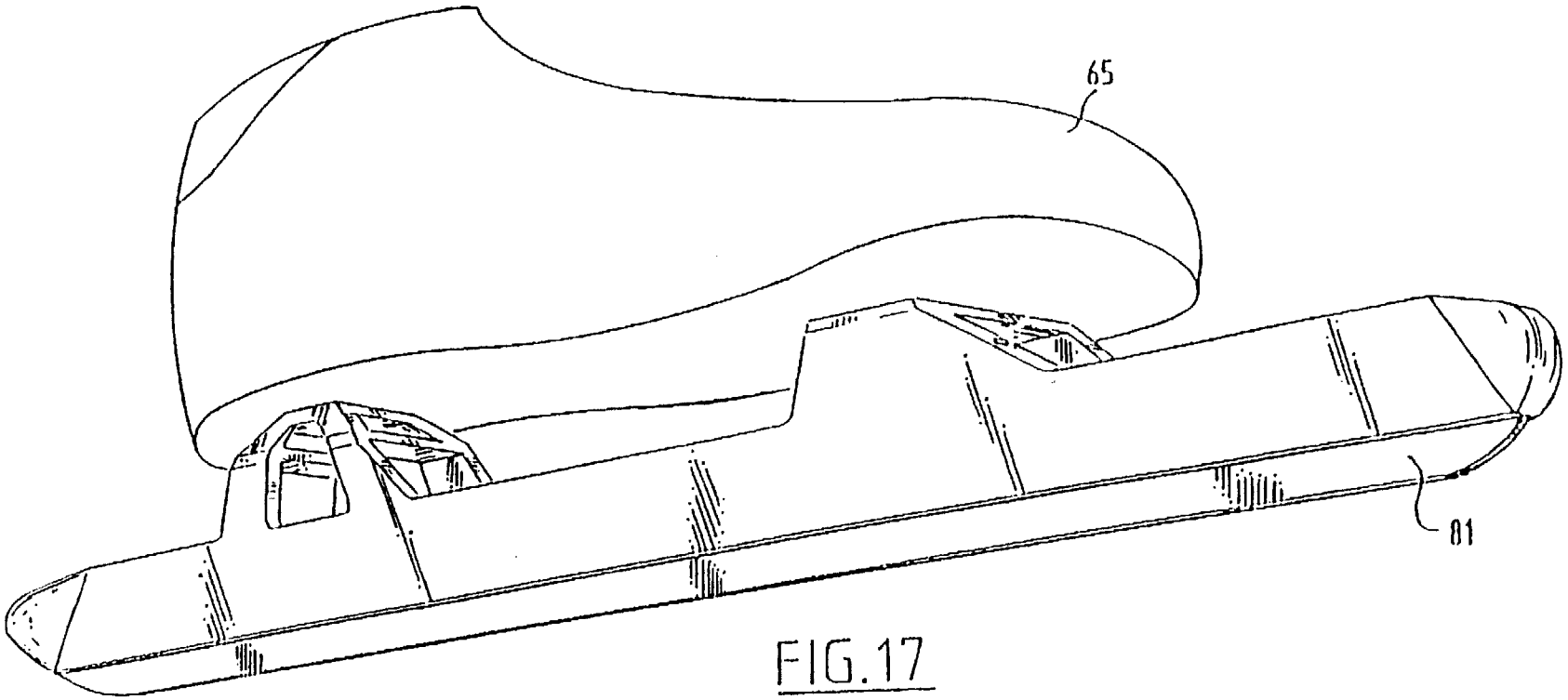
FIG. 17 shows an ice skate with a frame as according to FIG. 16.

FIG. 17 shows the shoe 65 to which is attached the bracket 79 as according to FIG. 16.

I claim:

[1. An elongated frame for attachment to a skating shoe that includes a sole plate and two longitudinally spaced apart connection members extending away from the sole plate, said elongated frame having first and second spaced-apart fastening brackets with openings through which said two connection members can respectively extend, one of said openings comprising a slot which extends transversely of said elongated frame to enable adjustable transverse attachment of said frame to said skating shoe.]

[2. An elongated frame according to claim 1, wherein said frame includes means for the attachment thereto of at least three freely rotatable wheels that constitute at least two groups of successive wheels, said wheels being attached to said frame such that they are aligned in a principal plane and an underlying tangent line to one group of wheels extends below all other wheels.]

[3. An elongated frame according to claim 2, wherein said means includes a pair of aligned slots which extend longitudinally of said frame.]

[4. An elongated frame according to claim 3, wherein one pair of said aligned slots are generally Z-shaped.]

[5. A support assembly for attachment to a skating shoe that has a sole plate and two longitudinally spaced-apart connection members extending outwardly from said sole plate, said support assembly including an elongated frame having first and second spaced-apart fastening brackets with openings through which said two connection members can respectively extend, one of said openings comprising a slot which extends transversely of said elongated frame to enable adjustable transverse attachment of said frame to said skating shoe, and at least three wheel assemblies with freely rotatable wheels attached to said frame so that said wheels are aligned in a principal plane and so that an underlying tangent line of a group of two successive wheels extends below all other wheels.]

[6. A support assembly according to claim 5, wherein said frame includes pairs of aligned slots for the attachment of said wheel assemblies.]

[7. A support assembly according to claim 6, wherein one pair of said aligned slots is generally Z-shaped.]

[8. A support assembly according to claim 5, wherein said frame has a front end and a rear end and wherein the wheel of the wheel assembly attached to said frame nearest said rear end is larger in diameter than the wheels of either of the other wheel assemblies.]

[9. An elongated frame for attachment to a skating boot which includes a sole plate, two longitudinally spaced-apart connection members extending away from the sole plate, and an eccentric positioning ring having ribs which is positionable along one of said connection members, said elongated frame having first and second spaced-apart fastening brackets with openings through which said two connection members can respectively extend one of said openings comprising a slot which is surrounded with ribs that extend in a direction generally transverse to said slot and which can co-act with the ribs of said positioning ring, said positioning ring enabling adjustable positioning of said frame to said skating shoe.]

[10. An elongated frame according to claim 9, wherein said frame includes means for the attachment thereto of at least three freely rotatable wheels that constitute at least two groups of successive wheels, said wheels being attached to said frame such that they are aligned in a principal plane and an underlying tangent line to one group of wheels extends below all other wheels.]

[11. An elongated frame according to claim 10, wherein said means includes a pair of aligned slots which extend longitudinally of said frame.]

[12. An elongated frame according to claim 11, wherein one pair of said aligned slots are generally Z-shaped.]

*13. An elongated frame for attachment to a skating shoe that includes a sole plate and two longitudinally spaced apart connection members extending away from the sole plate, said elongated frame having first and second spaced apart fastening brackets with openings through which said two connection members can respectively extend, one of said openings comprising a slot which extends transversely of said elongated frame to enable adjustable transverse attachment of said frame to said skating shoe, said frame including means for the attachment thereto of at least three freely rotatable wheels that constitute at least two groups of successive wheels, said wheels being attached to said frame such that they are aligned in a principal plane and an underlying tangent line to one group of wheels extends below all other wheels, said means for attachment including a pair of aligned slots which extend longitudinally of said frame.*

*14. An elongated frame according to claim 13, wherein one pair of said aligned slots are generally Z-shaped.*

*15. A support assembly for attachment to a skating shoe that has a sole plate and two longitudinally spaced apart connection members extending outwardly from said sole plate, said support assembly including an elongated frame having first and second spaced apart fastening brackets with openings through which said two connection members can respectively extend, one of said openings comprising a slot which extends transversely of said elongated frame to enable adjustable transverse attachment of said frame to said skating shoe, and at least three wheel assemblies with freely rotatable wheels attached to said frame so that said wheels are aligned in a principal plane and so that an underlying tangent line of a group of two successive wheels extends below all other wheels, said frame including pairs of aligned slots for attachment of said wheel assemblies.*

*16. A support assembly according to claim 14, wherein one pair of said aligned slots is generally Z-shaped.*

*17. A support assembly for attachment to a skating shoe that has a sole plate and two longitudinally spaced apart connection members extending outwardly from said sole plate, said support assembly including an elongated frame having first and second spaced apart fastening brackets with openings through which said two connection members can respectively extend, one of said openings comprising a slot which extends transversely of said elongated frame to enable adjustable transverse attachment of said frame to said skating shoe, and at least three wheel assemblies with freely rotatable wheels attached to said frame so that said wheels are aligned in a principal plane and so that an underlying tangent line of a group of two successive wheels extends below all other wheels, said frame having a front end and a rear end and wherein the wheel of the wheel assembly attached to said frame nearest said rear end is larger in diameter than the wheels of either of the other wheel assemblies.*

*18. An elongated frame for attachment to a skating boot which includes a sole plate, two longitudinally spaced apart*

*connection members extending away from the sole plate, and an eccentric positioning ring having ribs which is positionable along one of said connection members, said elongated frame having first and second spaced apart fastening brackets with openings through which said two connection members can respectively extend, one of said openings comprising a slot which is surrounded with ribs that extend in a direction generally transverse to said slot and which can co-act with the ribs of said positioning ring, said positioning ring enabling adjustable positioning of said frame to said skating shoe, said frame and said fastening brackets comprising a one-piece integral construction.*

*19. An elongated frame according to claim 18, wherein said frame includes means for the attachment thereto of at least three freely rotatable wheels that constitute at least two groups of successive wheels, said wheels being attached to said frame such that they are aligned in a principal plane and an underlying tangent line to one group of wheels extends below all other wheels.*

*20. An elongated frame according to claim 19, wherein said means for attachment includes a pair of aligned slots which extend longitudinally of said frame.*

*21. An elongated frame according to claim 20, wherein one pair of said aligned slots are generally Z-shaped.*

*22. An elongated frame for attachment to a skating shoe that includes a sole plate and two longitudinally spaced apart connection members extending away from the sole plate, said frame comprising an integral extruded body having portions thereof selectively removed to define a pair of sidewalls, said frame including first and second spaced apart fastening brackets each of which includes an upper wall having an opening formed therethrough for receiving one of said connecting members, each upper wall having opposite sides, said opposite sides being connected to said sidewalls by side legs, said frame and said fastening brackets comprising a one-piece integral construction, one of said upper walls having an undersurface, said undersurface having longitudinally extending ribs disposed at fixed pitch distances formed thereon adjacent the opening formed therethrough.*

*23. A frame as defined in claim 22, wherein each upper wall defines an upwardly facing substantially planar surface, said surfaces on said pair of fastening brackets being disposed in planes offset from one another.*

*24. A frame as defined in claim 22, wherein at least one of said sidewalls has an outwardly facing surface having longitudinally extending ribs disposed at a fixed pitch distance formed thereon.*

*25. A frame as defined in claim 24, wherein said one sidewall has an opening formed therethrough adjacent said ribs.*

*26. An elongated frame for attachment to a skating shoe comprising an integral extruded profiled bar including a pair of spaced sidewalls for connection to carrier means such as a plurality of wheels or an ice skate blade, a first transverse wall connected to said sidewalls, a second transverse wall spaced from said first transverse wall in a direction away from said sidewalls, said second transverse wall being connected to said sidewalls, portions of said second transverse wall being selectively removed to define a first upper wall of a first fastening bracket for coupling with the toe of a skating shoe, portions of said sidewalls being selectively removed above said first sidewall to define first side legs connecting said upper wall to said sidewalls, said frame and said first fastening bracket comprising a one-piece integral construction, said profiled bar sidewalls having formed thereon more than two longitudinally extending ribs at fixed pitch distances, portions of said bar being removed to define at least one zone provided with ribs at fixed pitch distances extending longitudinally of said frame.*

*27. A frame as defined in claim 26, including a third transverse wall connected to said sidewalls, said third transverse wall being spaced from said second transverse wall in a direction away from said sidewalls, portions of said third transverse wall being selectively removed to define a second upper wall of a second fastening bracket for coupling with the heel of a skating shoe, portions of said sidewalls being selectively removed above said first sidewall to define second side legs connecting said second upper wall to said sidewalls, said frame and said second fastening bracket comprising a one-piece integral construction.*

*28. An elongated frame for attachment to a skating shoe comprising an integral extruded profiled bar including a pair of spaced sidewalls for connection to carrier means such as a plurality of wheels or an ice skate blade, said bar having a front end and a rear end, said bar including spaced sidewalls having inwardly facing side surfaces and outwardly facing side surfaces, a first transverse wall connected to said sidewalls, a second transverse wall spaced from said first transverse wall in a direction away from said sidewalls, said second transverse wall being connected to said sidewalls, portions of said second transverse wall being selectively removed to define a first upper wall of a first fastening bracket for coupling with the toe of a skating shoe, portions of said sidewalls being selectively removed above said first transverse wall to define first, side legs connecting said upper wall to said sidewalls, said outwardly facing side surfaces each including portions which lie in a plane and are disposed substantially from said front end to said rear end of the frame, and a third transverse wall connected to said sidewalls, said third transverse wall being spaced from said second transverse wall in a direction away from said sidewalls, portions of said third transverse wall being selectively removed to define a second upper wall of a second fastening bracket for coupling with the heel of a skating shoe, portions of said sidewalls being selectively removed above said first transverse wall to define second side legs connecting said second upper wall to said sidewalls, said frame and second fastening bracket comprising a one-piece monolithic construction.*

* * * * *